United States Patent Office.

JOSEPH BRAKELEY, OF BORDENTOWN, NEW JERSEY.

Letters Patent No. 75,242, dated March 10, 1868.

IMPROVED MODE OF PRESERVING EGGS.

The Schedule referred to in these Letters Patent and making part of the same.

TO ALL WHOM IT MAY CONCERN:

Be it known that I, JOSEPH BRAKELEY, of Bordentown, in the county of Burlington, in the State of New Jersey, have invented a new and improved Mode of Preserving Eggs of hens and other fowls; and I do hereby declare that the following is a full and exact description thereof.

The nature of my invention consists in drying eggs of hens or other fowls, without divesting them of their natural integuments. By this means I am enabled to dry them without exposing the egg mass to the direct action of the atmosphere, whereby the preservation of the natural qualities of the egg is greatly promoted.

To enable others skilled in the art to make and use my invention, I will proceed to describe its construction and operation.

I take an egg, in its natural condition, and divest the integument thereof of its mineral portions by immersing it for a sufficient time in dilute acid, as acetic acid for instance, after which I wash the egg in cold water, for the purpose of cleansing it from any acid that may adhere. I then dry it *in vacuo* at a low temperature.

When the egg is to be used, it may be laid in cold water for a few moments, when the integument can be readily removed, and the egg can then be used.

What I claim as my invention, and desire to secure by Letters Patent, is—

The preservation of eggs of hens or other fowls, in the manner substantially as set forth above, that is to say, by drying them within their natural integument.

JOSEPH BRAKELEY.

Witnesses:
W. A. BOSS,
O. E. P. HAZARD.